United States Patent
El Gamal et al.

(10) Patent No.: US 12,522,540 B2
(45) Date of Patent: Jan. 13, 2026

(54) METHOD OF PRODUCING SULFUR CONCRETE USING CARBONATED SALTS

(71) Applicants: United Arab Emirates University, Al Ain (AE); ZAYED UNIVERSITY, Abu Dhabi (AE)

(72) Inventors: Maisa El Gamal, Abu Dhabi (AE); Ali Al Marzouqi, Al Ain (AE); Ameera Mohammad, Al Ain (AE); Noran Mousa, Al Ain (AE)

(73) Assignees: UNITED ARAB EMIRATES UNIVERSITY, Al-Ain (AE); ZAYED UNIVERSITY, Abu Dhabi (AE)

( * ) Notice: Subject to any disclaimer, the term of this patent is extended or adjusted under 35 U.S.C. 154(b) by 0 days.

(21) Appl. No.: 18/633,958

(22) Filed: Apr. 12, 2024

(65) Prior Publication Data
US 2025/0320161 A1    Oct. 16, 2025

(51) Int. Cl.
*C04B 14/06* (2006.01)
*C04B 7/42* (2006.01)
(Continued)

(52) U.S. Cl.
CPC .............. *C04B 28/36* (2013.01); *C04B 7/422* (2013.01); *C04B 7/428* (2013.01); *C04B 7/432* (2013.01); *C04B 14/06* (2013.01); *C04B 14/30* (2013.01); *C04B 24/16* (2013.01); *C04B 2111/00775* (2013.01)

(58) Field of Classification Search
CPC ......... C04B 28/36; C04B 7/422; C04B 7/428; C04B 7/432; C04B 14/06; C04B 14/30; C04B 24/16; C04B 2111/00775; C04B 2111/00474; C04B 2111/00767;
(Continued)

(56) References Cited

U.S. PATENT DOCUMENTS

| | | | |
|---|---|---|---|
| 2011/0065854 A1* | 3/2011 | Mohamed | C04B 18/162 422/139 |
| 2012/0097074 A1* | 4/2012 | Kalb | C04B 28/36 106/803 |

(Continued)

OTHER PUBLICATIONS

Othman et al. Carbide lime in acid mine drainage treatment, Journal of Water Process Engineering, v 15, 2017, DOI: 10.1016/j.jwpe.2016.06.006. (Year: 2017).*

*Primary Examiner* — Amber R Orlando
*Assistant Examiner* — Marites A Guino-O Uzzle
(74) *Attorney, Agent, or Firm* — MH2 Technology Law Group, LLP (57) ABSTRACT

A method of producing sulfur concrete using precipitated salts. The method comprises obtaining precipitated salts from a salt solution, which comprises:
mixing the salt solution with calcium oxide to form a basic suspension; treating the basic suspension using carbon dioxide to cause salts to precipitate from the salt solution; and separating the precipitated salts out from the treated basic suspension to produce a treated salt solution. The method also comprises forming the sulfur concrete, which comprises mixing elemental sulfur with a modifying agent to form a sulfur-containing polymer; pre-heating aggregates comprising at least the precipitated salts; and mixing the aggregates with the sulfur-containing polymer to form the sulfur concrete.

14 Claims, 7 Drawing Sheets

(51) Int. Cl.
*C04B 7/43* (2006.01)
*C04B 14/30* (2006.01)
*C04B 24/16* (2006.01)
*C04B 28/36* (2006.01)
*C04B 111/00* (2006.01)

(58) Field of Classification Search
CPC ...... C04B 2111/00; C04B 2111/00017; Y02W 10/10; Y02W 10/20; Y02W 30/91
See application file for complete search history.

(56) References Cited

U.S. PATENT DOCUMENTS

| | | | | |
|---|---|---|---|---|
| 2013/0112115 A1* | 5/2013 | Sotillo | .................... | C04B 2/005 106/710 |
| 2013/0256939 A1* | 10/2013 | Devenney | ............... | C04B 28/10 423/430 |
| 2015/0307400 A1* | 10/2015 | Devenney | ............... | C04B 28/10 423/430 |
| 2017/0050871 A1* | 2/2017 | El-Naas | ................ | B01F 23/231 |

\* cited by examiner

METHOD OF PRODUCING SULFUR CONCRETE USING CARBONATED SALTS

TECHNICAL FIELD

The present invention relates to a method for processing a salt solution, together with carbon dioxide, to cause the precipitation of carbonated salts and then using the salts to form sulfur concrete.

BACKGROUND

Potable water production is an issue of global concern. It is estimated that around one billion people have no access to clean drinking water and more than two billion people live in regions with water scarcity. Desalination has become an essential source of drinking water production, with the use of both thermal desalination methods and membrane methods continuing to grow. As the Middle East continues to experience water shortages due to fast-growing populations, expanding industries, and increasing agricultural activities, countries such as the United Arab Emirates are leaders in large-scale seawater desalination. Between 1999 and 2001, the production of desalination water in the UAE increased by 30% due to continued economic and population growth.

However, the constraints on the desalination process are the disposal costs of the concentrated brine produced and the effect of brine on the environment. Inappropriate land disposal of reject brine from desalination plants contaminates the groundwater and affects soil properties. High-level salt concentrations in reject brine, such as high levels of sodium, chloride, and boron, can reduce plants and soil productivity and cause soil salinization. Managing reject brine from desalination plants can be a major issue and it is very expensive, especially if plants are placed away from coastal areas. The total production of brine around the world is estimated to be 142 million $m^3$/day and 14% of this output is produced in the UAE. Disposing of the reject brine must be carefully managed after appropriate feed water pretreatment, proper desalination process, and maximizing the system recovery, to minimize the brine stream, and hence reduce the cost of subsequent disposal. Some of the options for brine disposal from inland desalination plants are disposal to surface water bodies and sewer systems, disposal to evaporation ponds, deep well injection, and land applications of brine. Despite their high evaporation efficiency due to high temperatures, evaporation ponds suffer from many drawbacks, including the need for huge areas and the possibility of contaminant leakage into soil and groundwater.

The management of industrial waste is not the only environmental challenge facing the Middle East. Like all regions and countries of the world, the UAE is faced with global warming and climate change as two of the most critical and pressing issues. The major cause of global warming is the emission of greenhouse gases, such as carbon dioxide into the atmosphere. The measured increases in the average earth surface temperature are linked to the amount of carbon dioxide in the atmosphere. About half of the extra carbon dioxide emitted to the atmosphere will dissolve in the oceans and increase the acidity which is very risky to the aquatic life. There are several sources of $CO_2$ emissions, predominately from the combustion of fossil fuels in power generation, industrial facilities, buildings, and transportation. Many countries have decided to mitigate the global warming and climate change problems by decreasing $CO_2$ emissions.

Another way of reducing the amount of $CO_2$ in the atmosphere is carbon capture, which is already in use. There are four major technical methods to capture $CO_2$ from fossil fuel power plants, including pre-combustion, post-combustion, oxyfuel, and chemical looping combustion. All these $CO_2$ capture methods have drawbacks that reduce their large-scale industrial application. Carbonate looping is one of the common techniques used for $CO_2$ capture. The absorption of $CO_2$ into reactive solvents is also one of the most favorable technologies for capturing $CO_2$, because of its maturity, cost-effectiveness, and capability of handling high flowrate exhaust streams.

SUMMARY

A method producing sulfur concrete using precipitated carbonated salts is disclosed. The method comprises: obtaining precipitated salts from a salt solution and forming the sulfur concrete. Obtaining the precipitated salts comprises: mixing the salt solution with calcium oxide to form a basic suspension having at least the calcium oxide and the salt solution as constituents; treating the basic suspension using carbon dioxide so that at least a portion of the carbon dioxide reacts with the constituents to cause carbonated salts to precipitate from the salt solution; and separating the precipitated carbonated salts out from the treated basic suspension to produce a treated salt solution. Forming the sulfur concrete comprises: mixing elemental sulfur with a modifying agent to form a sulfur-containing polymer; pre-heating aggregates to a pre-determined temperature, wherein the aggregates comprise at least the precipitated carbonated salts; and mixing the aggregates with the sulfur-containing polymer to form the sulfur concrete. The calcium oxide may be comprised in carbide lime waste. The salt solution may comprise brine.

The precipitated carbonated salts may comprise one or more of: calcium carbonate, sodium bicarbonate/carbonate, magnesium hydroxide, sodium silicate, and/or potassium carbonate/bicarbonate.

Treating the basic solution may comprise bubbling a carbon dioxide containing feed gas through the basic suspension. The carbon dioxide may be present in the feed gas by at least 10% by mass. Treating the basic solution may comprise drawing off a stream of treated feed gas.

Separating the precipitated salts may comprise directing the treated basic suspension to a mixing tank to retain the treated basic suspension as a slurry.

Separating the precipitated salts from the treated basic suspension may comprise one or more of: filtration, sedimentation, and/or chemical recovery.

The modifying agent may comprise oligomeric hydrocarbons. The modifying agent may comprise bitumen.

The aggregates may comprise the separated salts. The aggregates may comprise sand and/or solid carbide lime waste.

The aggregates may be pre-heated to 120° C. to 200° C. The aggregates may be mixed with the sulfur-containing polymer at 120° C. to 140° C. The mixed aggregates and sulfur-containing polymer may be cured at 40° C. for 24 hours. Additional sand and/or fillers may be added to the mixed aggregates and sulfur-containing polymer.

Also provided is a medical waste landfill comprising sulfur concrete produced according to any of the methods described herein.

Also provided is wastewater infrastructure comprising sulfur concrete produced according to any of the methods described herein.

Also provided is a treated salt solution produced according to any of the methods described herein.

Also provided is a treated feed gas produced according to any of the methods described herein.

Also provided are one or more precipitated salts produced according to any of the methods described herein.

Further optional features are described herein and a selection of those features are set out in the dependent claims.

BRIEF DESCRIPTION OF THE DRAWINGS

Further features of the disclosure are described hereinafter, by way of non-limiting examples of the invention, with reference to and as illustrated in the accompanying drawings, in which:

FIGS. 9(*a*) and 9(*b*) show results from SEM analyses for collected solids samples as described herein.

FIGS. 9(*c*) and 9(*d*) show results from EDS analyses for the collected solids samples as described herein.

DETAILED DESCRIPTION

The Applicant has conceived, developed, and tested a process that allows the addressing of more than one environmental issue at the same time, namely: finding a use for managing high-salinity water or brine outputs (for example, outputs from desalination plants), capturing carbon dioxide, and using waste materials from other industries as useful resources. The process addresses challenges that are of particular interest to the Middle Eastern region. The Applicant expects that the process disclosed herein will have a significant impact on all three areas of environmental technology, namely, management of industrial waste, management of saline water outputs, and the desire to manage carbon dioxide in the atmosphere.

As mentioned above, managing reject brine from desalination plants can be a major issue and the Applicant is of the view that it is desirable to look upon reject brine as a useful resource instead of waste. The Applicant's methods described herein use aqueous carbonation to manage brine by converting it into minerals through $CO_2$ sequestration. Furthermore, the Applicant's methods employ aqueous carbonation using industrial waste rather than ammonia or sodium hydroxide, which are expensive. The Applicant expects this to dramatically reduce the cost of carbonation.

The aqueous carbonation method involves using industrial waste, nanoparticles, and modified carbonation steps to increase the output of different minerals.

According to the Applicant's methods, the minerals derived from the aqueous carbonation are utilized as aggregates to produce sustainable concrete. The obtained minerals can be mixed with elemental sulfur and waste materials to form sulfur concrete. In the preliminary studies conducted by the Applicant, brine-derived minerals obtained through aqueous carbonation utilizing industrial waste and mixing it with modified sulfur has found to be both physically strong and chemically stable when compared to other concrete mixes. The Applicant considers that the sulfur concrete will have many uses. For example, the methods described herein may be used to produce sulfur concrete that can be deployed for managing medical waste landfills and wastewater infrastructure as it has been observed that the porosity of the sulfur concrete is very small and would not allow the leaching of the dissolved wastes and microorganisms. The methods described herein would be an important contributor to reject brine management by using wastes from desalination plant brine, greenhouse gas $CO_2$, and industrial waste for carbonation to produce green construction materials.

Figure 1:
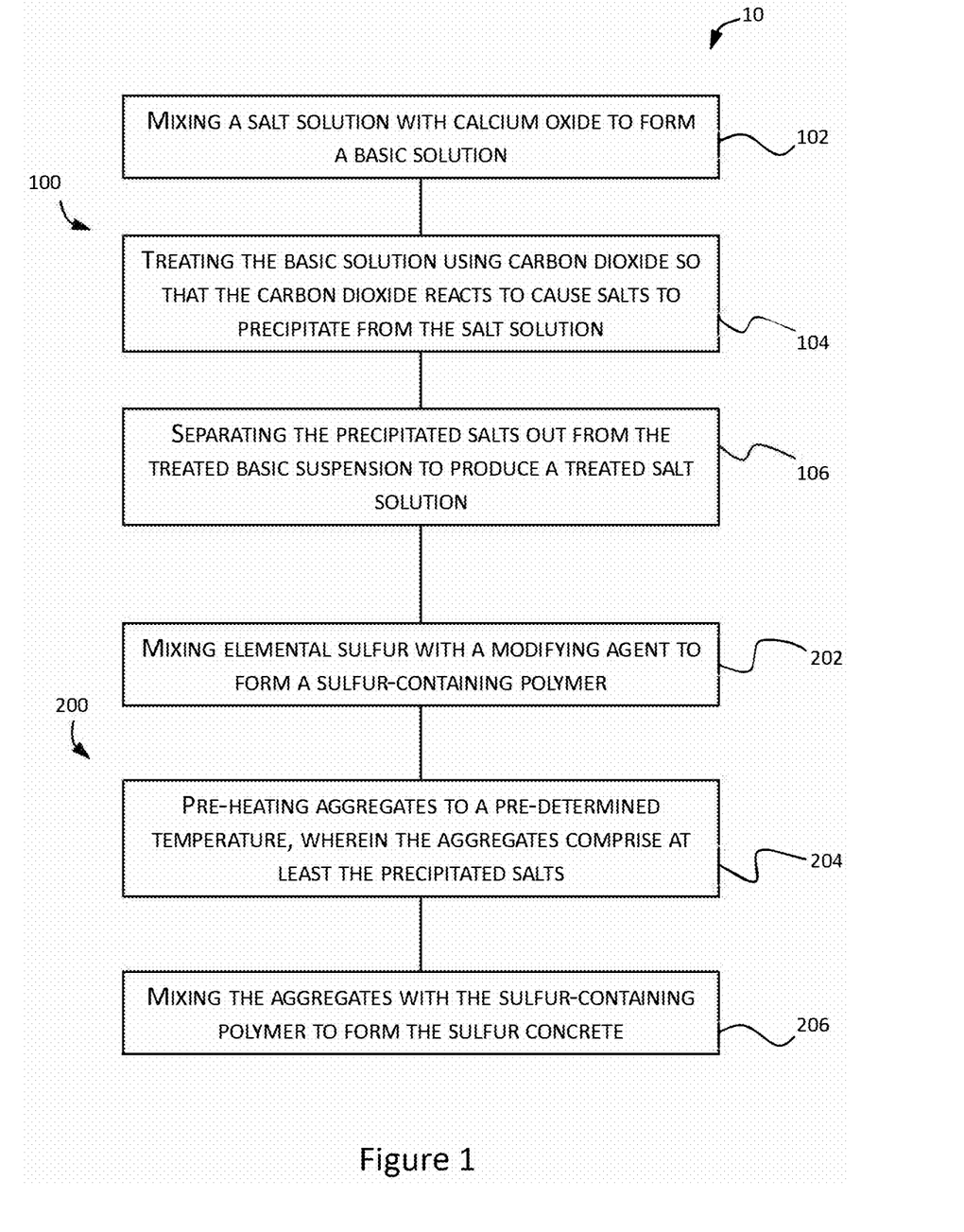
FIG. 1 is a flowchart that illustrates a method of producing sulfur concrete using precipitated salts, as described herein.

FIG. 1 is flowchart that illustrates the method 10 developed for producing sulfur concrete using precipitated salts. The method comprises obtaining 100 brine salts from salt solution; and forming 200 the sulfur concrete using elemental sulfur and the precipitated salts.

To obtain precipitated salts from a salt solution, at block 102, the salt solution is mixed with calcium oxide to form a basic suspension having at least the calcium oxide and the salt solution as constituents. The calcium oxide converts to calcium hydroxide as soon as it makes contact with the salt solution.

In embodiments of the present disclosure, the salt solution is a brine solution. In embodiments, the brine solution is obtained as a byproduct from desalination processes, such as a reverse osmosis desalination process, for example.

At block 104, the basic suspension (salt solution and calcium hydroxide) is treated with carbon dioxide. The carbon dioxide dissolves in the suspension, reacting with the calcium hydroxide, salt, and water, to form calcium hydrogen carbonate, which precipitates out of the suspension.

In embodiments, the production of sodium hydrogen carbonate utilizes a modified Solvay process. The modification of the Solvay process in embodiments of the present disclosure does not involve the use of ammonia. Instead, in embodiments, calcium oxide is added directly to the reactor, which converts to calcium hydroxide as soon as it contacts the brine, raises the pH, and captures $CO_2$ by reacting with sodium chloride. In embodiments, the process has the dual benefit of reducing brine salinity and capturing carbon dioxide. In addition, the modified process eliminates the need for ammonia recovery, which is an energy intensive step in the Solvay process.

In embodiments of the present disclosure, the treatment (and dissolution of) carbon dioxide is done using a gas-liquid reactor. In embodiments, the gas-liquid reactor is a bubble column reactor. In bubble column reactors of embodiments, a discontinuous gas phase in the form of bubbles is released at the bottom of a vessel through an orifice and moves relative to the continuous liquid phase, exchanging mass, momentum, and energy. In embodiments, the gas phase is carbon dioxide, and the liquid phase is basic suspension. Bubble reactors are beneficial for processes that require a large interfacial area for gas-liquid mass transfer and large liquid holdup that is favorable for slow liquid phase reactions. The distinct advantages of bubble columns over other gas-liquid reactors are their simple design and construction, low operation and maintenance costs, excellent heat and mass transfer characteristics, as well as temperature control, absence of moving parts, and high mixing ability.

In embodiments, a desalination process based on the modified Solvay process using a unique reactor system and gas distribution configuration is used. The brine is mixed with a waste source with a high percentage of calcium oxide, namely carbide lime waste, and reacted with gas such as effluent gases (10% $CO_2$ and 90% air) to obtain a clean gas free of $CO_2$, treated brine with lower salinity and collected solids to be used later in concrete production.

At block 106, precipitated salts and remaining calcium oxide are separated out from the treated basic suspension to produce a treated salt solution, and precipitated salts.

Forming 200 the sulfur concrete comprises, at block 202, mixing elemental sulfur with a modifying agent to form a sulfur-containing polymer. The sulfur may be heated to between 130-150° C.

In embodiments, the modifying agent is bitumen. The bitumen may be mixed with a mass fraction of 2.5%. In embodiments, an emulsifying agent is used to facilitate the compatibility between the sulfur and the bitumen.

At block 204, aggregates are pre-heated to a predetermined temperature, wherein the aggregates comprise at least the precipitated salts. The aggregates may comprise the precipitated salts and sand. The pre-heating of the aggregates may be to a temperature of between 120-200° C.

At block 206, the preheated aggregates are mixed with molten sulfur-containing polymer to form the sulfur concrete. The mixing occurs at between 120-140° C., until a homogeneous mixture is obtained.

The Applicant expects that the disclosed methods allow the conversion of reject brine into a useful and reusable solid product, such as calcium carbonate and sodium bicarbonate. Furthermore, the treated brine, which, after being subjected to the methods described herein, is of a lower salinity, can be used for irrigation and other industrial applications and capturing $CO_2$ gas means that the industrial exhausts or flue gases will have less impact on the atmosphere.

Of particular importance, is that significant operational costs can be saved in comparison with the usual combined approach for $CO_2$ capture and brine desalination using traditional alkaline materials such as ammonia, sodium hydroxide, and CaO. These methods suffer from high operational costs associated with alkaline recovery—such as in the case of using ammonia—or the initial cost for feed alkaline material. In contrast, the methods described herein provide a combined approach for brine desalination and $CO_2$ capture using a solid waste material as the main alkaline reactant and, at the same time, utilize the solid products collected after the chemical reaction in the production of sulfur concrete. This significantly reduces the cost associated with carbonation processes, making it more economically viable for large-scale implementation. The sulfur concrete also involves the utilization of other industrial by-products, which is also environmentally beneficial. For instance, the sulfur used in the sulfur concrete-based material may be obtained as a byproduct of the oil and petroleum industry. Furthermore, using the obtained minerals from aqueous carbonation as aggregates for producing sustainable concrete reduces the reliance on traditional, non-renewable construction materials and contributes to the development of greener and more eco-friendly construction practices.

There is generally considered to be an oversupply of sulfur as a byproduct and using sulfur in the construction industry is one of the major uses of the byproduct. Sulfur has proven its viability as a binding material. For example, in road and highway construction, sulfur has been utilized in multiple methods—producing bitumen, asphalt sulfur, and different infrastructure sections. Furthermore, sulfur has shown superior properties when compared to normal concrete. Enhanced properties include reduced permeability, fast strength gain, durability, and high strength. Some investigations have shown enhanced bond, compressive, flexural, and tensile strength. Moreover, durability performance was significantly enhanced in addition to properties such as corrosion, and fatigue resistance. Permeability and thermal conductivity decreased which contributed to improving the durability. It is considered that sulfur demonstrated superior performance compared to normal concrete when used in dams, sewer pipes, and other structures that undergo harsh environmental conditions. Thus, an additional benefit of the methods described herein is the potential utilization of sulfur concrete for managing medical waste landfills and wastewater infrastructure. The low porosity of sulfur concrete prevents the leaching of dissolved wastes and microorganisms, providing a solution for safe waste containment and preventing environmental contamination. Furthermore, the sulfur concrete may find uses in environments that impact concrete structures due to high ambient temperatures, humidity, salt-contaminated dust, seawater, and underground salts.

The Applicant expects that the disclosed methods will also allow the use of carbide lime that would otherwise go to waste. Much of the carbide lime waste ends up in landfills despite being an undesirable corrosive waste. For example, carbide lime waste, which is also known as lime sludge, is a by-product of acetylene synthesis by hydrolysis reaction of calcium carbide ($CaC_2$). Carbide lime waste is generated in the aqueous slurry form and are mainly composed of calcium hydroxide (usually at more than 85%). The properties of carbide lime waste have been found to be similar to synthesized lime in the chemical and mineralogical compositions except for the presence of unreacted carbon in the carbide lime waste. Carbide lime waste also contains a low concentration of silicates and calcium carbonate. Despite its high alkalinity (generally, a pH of greater than 12), carbide lime waste is not considered to be a hazardous material; however, its handling and disposal process needs exceptional care, which can be expensive. In another related use for the methods, the process of acetylene synthesis produces carbon dioxide gases that may be used as a carbonation source for the carbide lime to collect the calcium carbonate products. Using carbide lime waste in a carbonation process can also produce specific crystal morphology, particle size, and shape, by controlling the carbonation conditions such as carbide lime waste concentration, operational temperature, and reaction duration.

The Applicant has found, as discussed further below with respect to the Applicant's experimental findings, that the precipitated salts can be incorporated into sulfur concrete to make composites. In combination with the waste materials, a waste-to-resource supply chain is established from brine to green construction materials. The initial studies have shown that the bricks formed from the composite of brine salts and sulfur concrete blocks have high strength and are chemically stable. The reactor designs will be upscaled for continuous aqueous carbonation and sulfur concrete production.

The Applicant considers that utilizing industrial wastes using the methods described herein will: reduce the overall cost of brine management and minimize the environmental impact of brine disposal on flora and fauna; provide environmentally beneficial alternatives to traditional construction materials; and improve the durability and long-term stability of structures using the sulfur concrete. As well as finding use in the desalination industry and numerous regional desalination plants, the resulting products of the method will find use in the construction and agricultural industries, for instance to irrigate or enhance soil quality.

Experimental Analysis of Process

The Applicant has verified the methods described herein through several experiments. In terms of testing the effectiveness of the methods, the Applicant conducted the experiments in two main phases. The first phase involved testing the processes of brine desalination and $CO_2$ capture, which employ waste alkaline material, in this case carbide lime waste. The second phase focused on the final production step for sulfur-based concrete and the subsequent characterization of the properties of the same. This phase was accomplished by utilizing the carbonated brine salts obtained from the brine desalination process, along with industrial by-products.

Brine Desalination and $CO_2$ Capture Using Carbide Lime Waste

The Applicant fabricated a prototype reactor system and tested the methods at different operational conditions. The conducted experimental observations and the thermodynamic analysis confirmed that using carbide lime waste and carbon dioxide could decrease the salinity of the treaded brine and collect useful solids.

For testing, reject brine samples with a salinity of around 70,150 ppm were obtained from Emirates Water and Electricity Company (EWEC), Abu Dhabi, UAE. A gas mixture of (10% $CO_2$ and 90% Air) was obtained from Abu Dhabi Oxygen Company, Al Ain, UAE.

Figure 2:
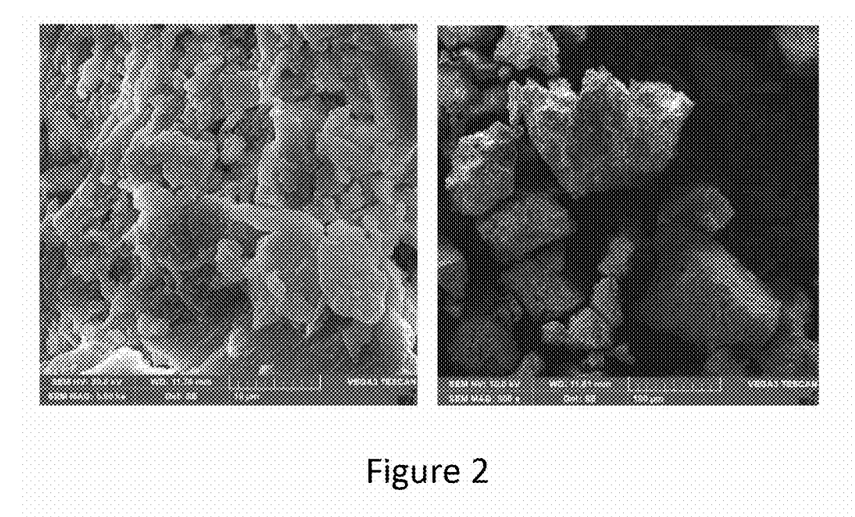
FIG. 2 shows SEM images of fresh carbide lime waste samples.

Carbide lime waste samples were collected from Arabian Industrial Gases Co., Ras Al-Khaimah, UAE. The samples were first dried at 120° C. for 48 h and then ground to fine particles (approximately 90 μm). The ground samples were then characterized using ICP analysis as shown in Table 1, and then used in the experiments. The surface morphology, texture, and shape of the fresh carbide lime waste samples were characterized using a Scanning Electron Microscope (SEM). The SEM micrographs of the cross-section of fresh carbide lime waste material as presented in FIG. 2 show a very coarse agglomerate that can be seen with prismatic morphology and high levels of Calcium content.

TABLE 1

Characteristics of the fresh carbide lime waste samples
Chemical Analysis of Fresh Solid Wastes

| | Type of waste | | | | | |
|---|---|---|---|---|---|---|
| | SiO2 (%) | Al2O3 (%) | FeO (%) | CaO (%) | MgO (%) | Others (%) |
| Percentage of total | 2.50 | 1.30 | 0.06 | 86.30 | 0.17 | 9.67 |

The effect of carbide lime waste on brine pH was studied and found that the high alkalinity of the carbide lime waste material (pH greater than 11) is a key factor for its high reactivity with brine salts and $CO_2$ gas. carbide lime waste thus promotes the precipitation of salts that become the metal source for application in sulfur concrete manufacturing. The fresh carbide lime waste samples were examined through FTIR analysis to investigate the presence of effective functional groups. The spectral outcomes were documented within a level of 500 to 4,000 $cm^1$ wavelength using spectral resolution and scans of 4 $cm^{-1}$ and 34 $cm^{-1}$, respectively.

Figure 3:
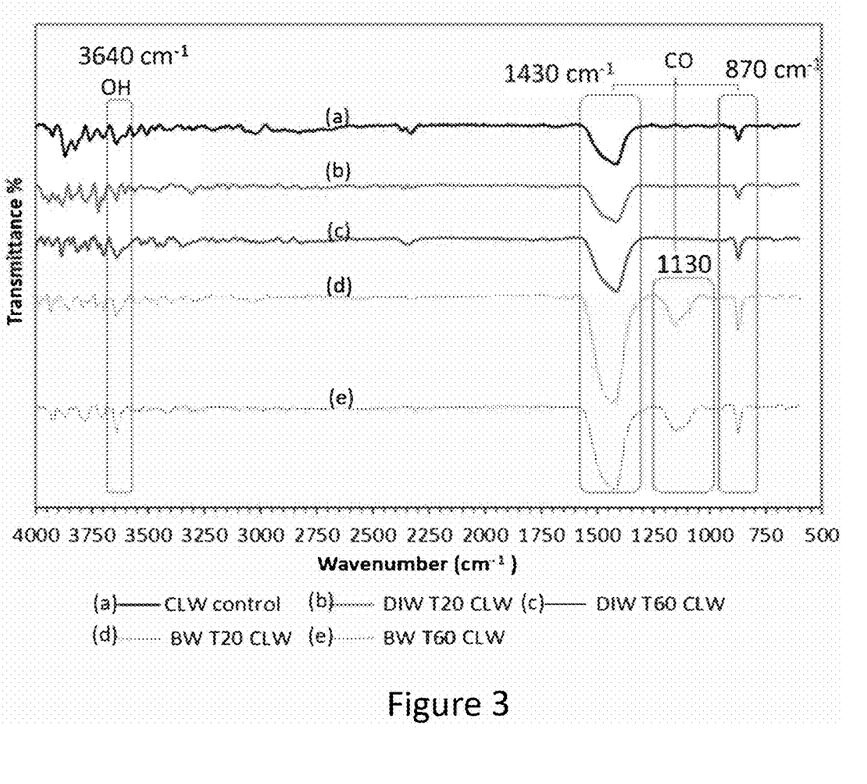
FIG. 3 shows FTIR spectra of fresh and treated carbide lime waste at different temperatures.

FTIR analysis, which is shown in FIG. 3, for the fresh and premixed samples with deionized water and brine at room temperature and 60° C. showed that the narrow absorption band at 3640 $cm^{-1}$, which related to the stretching mode of O—H, different vibration modes C—O of carbonate groups $CO_3^{-2}$ and the presence of carbonate groups indicate the slight contamination of the sample by atmospheric $CO_2$.

Figure 4:
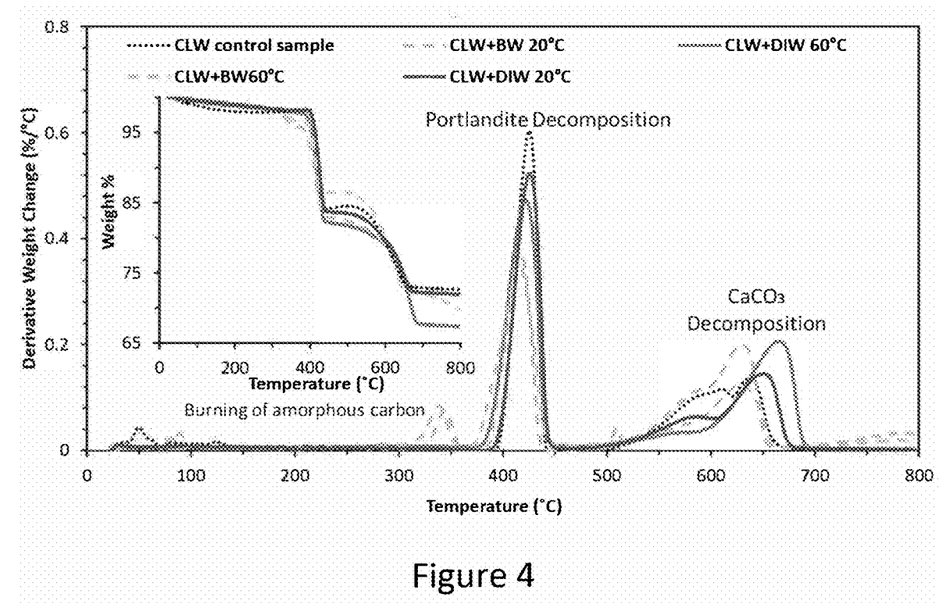
FIG. 4 shows TGA and DTG curves of fresh and treated carbide lime waste at different temperatures.

The thermos-gravimetric analysis of a sample of weight 2.0-5.0 mg with a heating rate of 15° C./min was conducted. A derivative (DTG) curve was used to describe the weight loss of each sample per unit of time for the temperature. It can be seen from FIG. 4 that from room temperature to approximately 311° C. there was a small mass loss of 5%. This loss is related to the amorphous carbon. The main thermal degradation of the fresh and premixed carbide lime waste samples is located at around 425° C. which results in a mass loss of around 20% which is related to Portlandite decomposition, while the decomposition of the hydroxide component was noticed at around 650° C. The structural properties for carbide lime waste samples were carried out using XRD analysis. The XRD analysis confirmed the presence of the well-crystallized phases and the predominance of calcium hydroxide and the minor presence of carbonate. The reduction of graphite content and the formation of a small amount of carbonate were also confirmed.

Figure 5:
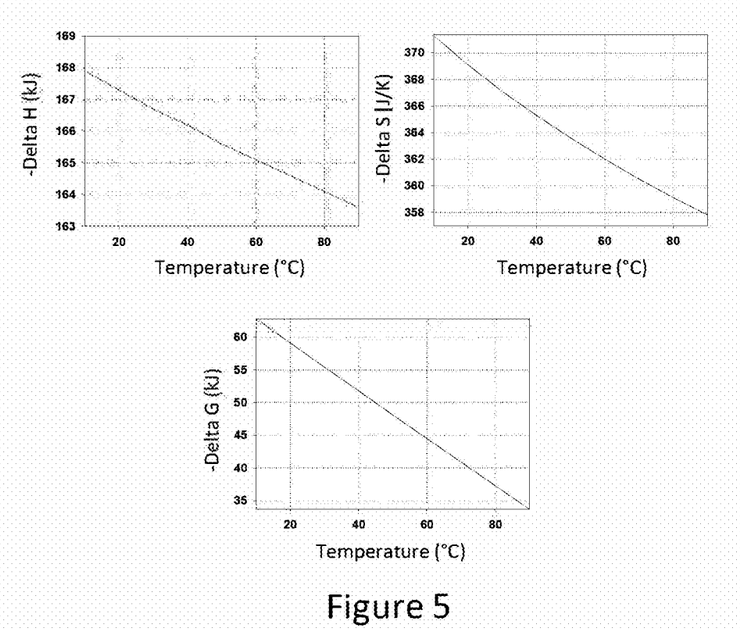
FIG. 5 shows thermodynamic data for a main reaction, as described herein.

Thermodynamic analysis for the main associated chemical reaction was also conducted. A chemical reactions and equilibrium software package (HSC Chemistry) was used for the evaluation of Gibbs free energy and heat of reaction at different brine salinity. The experimental investigation for the fresh carbide lime waste materials has confirmed that the main component is CaO/CaOH with a mass percentage of greater than 85%, and the main reactant in the brine is considered to be NaCl. This reaction is depicted in the following chemical equation:

$$2NaCl + CaO + 2CO_2 + H_2O \longrightarrow 2NaHCO_3 + CaCl_2$$

Using the HSC software for the thermodynamic analysis, as shown in FIG. 5 showing thermodynamic data for a main reaction, it illustrates that the reaction is spontaneous over a range of temperature 10° C.-90° C. as indicated by the negative ΔG, and exothermic reaction (negative ΔH) in the same temperature range. These thermodynamic outcomes provide a suitable range for reaction temperature, which can be used to manage the proposed approach.

Figure 6:
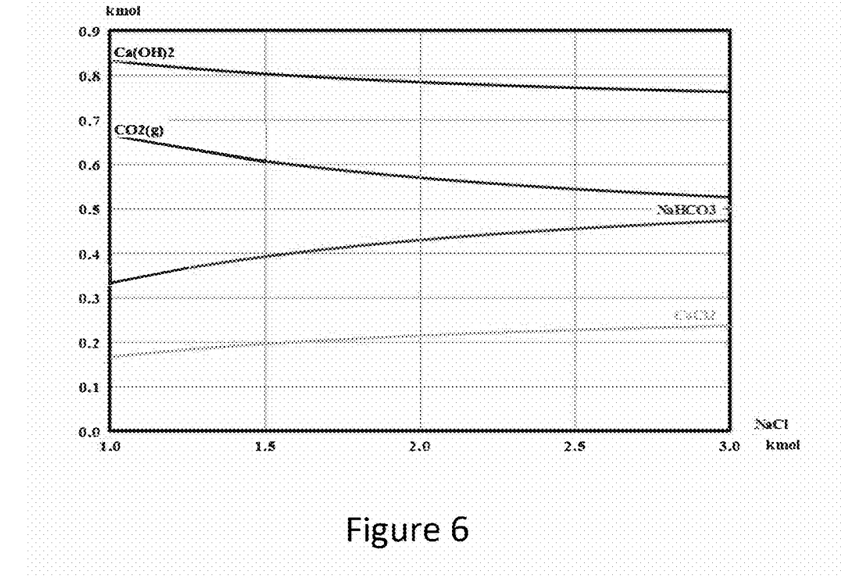
FIG. 6 shows the calculated equilibrium compositions versus the stoichiometric molar ratio of sodium chloride for the main reaction of FIG. 5.

From the thermodynamic analysis which is shown in FIG. 6, we can conclude that by increasing the brine salinity and hence increasing the concentration of sodium chloride solution (x-axis) higher desalination is achieved by producing more products such as $NaHCO_3$, and $CaCl_2$, and lower amount of carbide lime waste ($Ca(OH)_2$) is required and more $CO_2$ is captured, all the thermodynamics analysis outcomes supports the experimental investigation which has been carried out.

The experiments described above show that the methods described herein have many advantages over the conventional brine desalination and $CO_2$ capturing methods. For instance, high desalination and $CO_2$ capturing efficiency, low energy input, low environmental impact, producing valuable solid products, no requirements for regeneration energy, efficient process with a wide range of brine salinities (25,000 ppm 120,000 ppm), and treating high flow rates of brine and carbide lime waste mixture and $CO_2$ gas with the respect to the reactor volume.

Furthermore, the reactors may be very flexible and of a simple operational configuration (e.g., multi reactor in series, continuous, and semi-batch). The process is applicable for dilute and high $CO_2$ containing streams (3-15 vol. % $CO_2$), has high potential to be scaled up for industrial scale, and provides for easy handling of the solids. The process is stable and efficient in steady-state continuous operation. Pressure drops are minimal due to the low solid (carbide lime waste) to brine loading (2%-2.5% solids to brine by weight %) and the process is efficient at room temperature and atmospheric pressure conditions.

Figure 7:
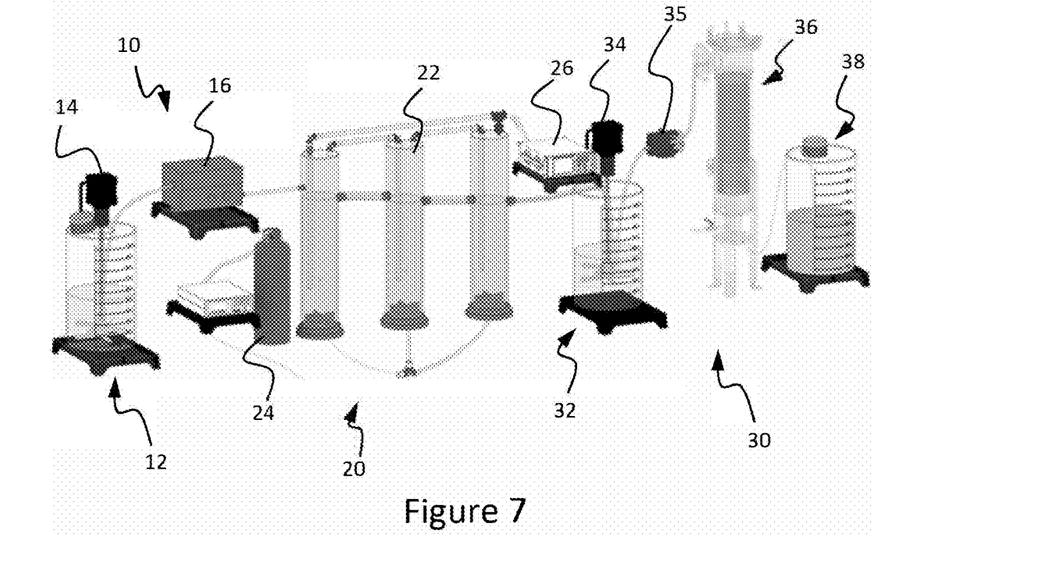
FIG. 7 schematically illustrates a desalination and $CO_2$ capture system, as described herein.

As shown in FIG. 7, the desalination and $CO_2$ capture system compromise three main parts; a feed preparation system 10, a reactor system 20, and the solids (products) collecting system 30.

In the feed preparation system 10, a feed tank 12 with a total capacity of 100 L was used to contain the fresh brine for each batch and the added carbide lime material. Mixer 14 was used to obtain a homogeneous mixture of the feed brine and carbide lime waste with controlled mixing velocity in the range of 2-10 RPS. A liquid pump 16 was used to transfer the mixture of brine and carbide lime waste from the feed tank 12 to the reactor system 20. The liquid pump 16 was operated at a specific volumetric flow rate to control the treated brine volume for each batch. Tubes connect the feed tank 12 with the liquid pump 16 and the liquid pump 16 with the reactor system 20.

In the reactor system 20, three plexiglass columns 22 connected in series were used to conduct the chemical reaction between the mixture of brine and carbide lime waste and the 10% $CO_2$ gas. Each column's working volume is around 10 L with a total capacity of 30 L for the three columns. The columns are connected using tubes which are directed with specific slop to enable the mixture to flow naturally with gravity to the following column unit. At the bottom of each column 22, a Teflon base was fixed, and a gas distribution and mixing blade was installed in the center of the base. Each gas distribution blade was connected to a gas tube and connected through a T valve connection to a gas cylinder 24. The gas cylinder 24 compromises the source of the effluent gasses as a simulated composition of 10% $CO_2$ and 90% air. The effluent gasses are circulated back to the columns 22 through immersed plexiglass tubes to increase the contact time between the gas and the liquid. A portion of the effluent gases are directed to the $CO_2$ analyzer 26 to detect the percentage of $CO_2$ captured through. A back pressure regulator was installed to control the pressure inside the columns. The plexiglass reactors as used during the experiment can be used up to 2 bar gage pressure. The Applicant anticipates that a higher applied pressure on the system could be applied when commercially implemented by changing the material of the reactor system structure from plexiglass to another material such as the stainless steel.

Figure 8:
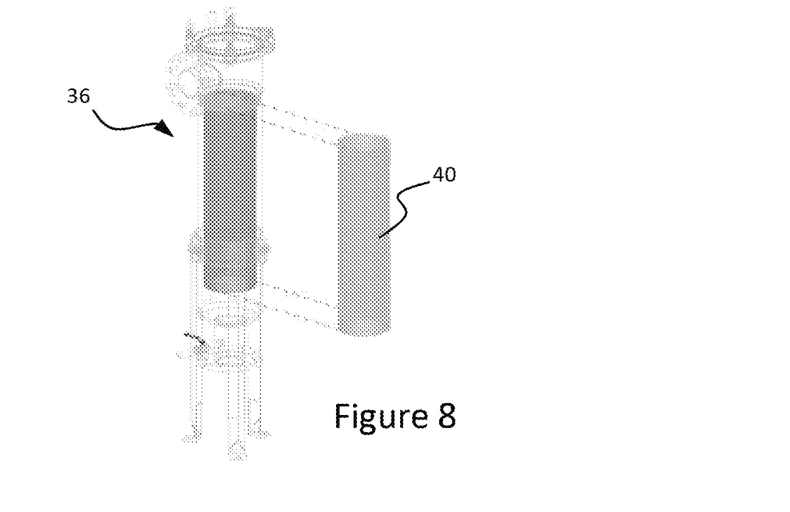
FIG. 8 schematically illustrates a filter press unit as described herein.

In the collecting system 30, a tube connects the third column 22 from the reactor system 20 to the effluent tank 32 to accumulate the treated brine and carbide lime waste with the $CO_2$ gases. A mixer 34 is used to ensure homogeneous mixing and slurry for the collected solids and the treated brine and prevent settling in the effluent tank 32. The collected slurry is directed to the filter press unit 36 by the liquid pump 35 through a tube. The filter press unit 36 contains a filter cloth 40 with the size of (1 μm) to separate the collected solids from the treated brine, as shown in FIG. 8. The treated and clear brine without any solids will be directed from the filter press unit 36 to the product tank 38 through a tube.

Screening experiments were conducted to evaluate the optimum range of the operational conditions of gas flow rate, liquid flow rate, and carbide lime waste concentration. Based on a suitable total treated brine volume in 24 hours (100-200 L/day), it was found that treating such brine quantity requires a specific gas flow rate to ensure maximum contact time (residence time of gas) and, accordingly, maximum reaction efficiency. In addition to this specific condition, the gas flow rate needs to be increased until it reaches the bubbling state in each column and this is also related to the liquid head inside the three columns.

After many trials without the carbide lime waste, which are simulated runs to find the optimum gas and liquid flow rates, it was found that the minimum gas flow rate that the system can operate at is 1800 ml/min and this was combined with the liquid flow rate of 110 ml/min; this indicates a gas to liquid flow ratio of 16.4. The total brine treated in 24 hours was around one and a half batches (158 L of brine).

In trials where carbide lime waste was added to the treated brine, the concentration of carbide lime waste in the brine was investigated to reach the maximum initial pH of the brine and carbide lime waste mixture. It was found that the minimum carbide lime waste that can be used to reach initial pH of 11.76 is 65 g/L feed brine. In the selected run at the optimum conditions, the reactor system 20 is running at room temperature and atmospheric pressure. The first column in the reactor system 20 was filled with the treated brine and carbide lime waste mixture from the feed tank and then exposed to a continuous $CO_2$ flow through a gas distributer blade from the bottom of the reactor. The gas flow rate was controlled to be 1800 ml/min by a mass flow controller and through a SCADA panel connected to a computer. The outlet gas stream was continuously passed through a $CO_2$ gas analyzer to determine the amount of $CO_2$ captured. The collected mixture after the third column was filtrated using the filter press unit 36 at the end of each patch experiment to separate the liquid from the produced solids. The solid characteristics were investigated by using the SEM, RAMAN, and XRD analytical techniques. The total solids collected at the end of the one-and-a-half batch reached around 14 kg, and the treated brine in the product tank was found with a salinity less than the feed brine by 39% and with a total dissolved solid reduction of 43%. The final pH of the treated brine reached around 7 and the measured $CO_2$ uptake by the carbide lime waste was found to reach 0.502 $gCO_2$/g carbide lime waste. Table 2 summarizes the results collected from the real run at the optimum operational conditions.

TABLE 2

Results summary of trials with carbide lime waste at the optimum conditions

| | |
|---|---|
| Total reactors volume (working volume) | 30 L |
| Gas flow rate (10% $CO_2$ vol. %) | 1800 ml/min |
| Liquid flow rate (brine and CLW mixture) | 110 ml/min |
| Total brine volume treated in 24 h | 158.4 L |
| Gas to liquid flow ratio | 16.36 |
| Total Solids (CLW) added to the treated brine | 10.296 kg |

TABLE 2-continued

Results summary of trials with carbide lime waste at the optimum conditions

| (65 g/L brine) | |
|---|---|
| Total collected solids (carbonated/products) after 24 h | 14.167 kg |
| Total brine salinity reduction | 39% |
| Total brine dissolved solids reduction | 43% |
| Initial brine pH after adding fresh solids (CLW) | 11.76 |
| The final pH of the brine collected after 24 h | 6.97 |
| Total $CO_2$ captured by fresh CLW after 24 h | 0.5 g $CO_2$/g CLW |

Three solid samples were prepared and were used in the concrete production stage. The first sample (P1) was fresh carbide lime without any carbonation process, the second sample (P2) is a carbonated carbide lime waste sample with $CO_2$ gas only without including the brine, and the third sample (P3) is the sample collected at the run of the optimum conditions of reacting the brine with the carbide lime waste and $CO_2$ gas.

Figure 9A:
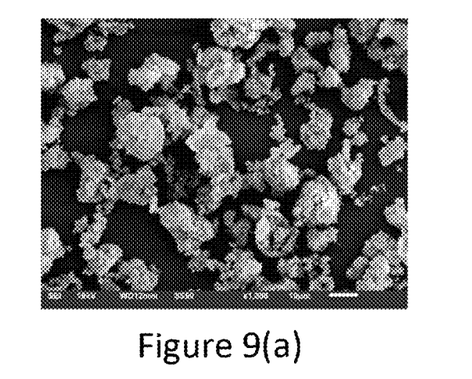
Figure 9B:
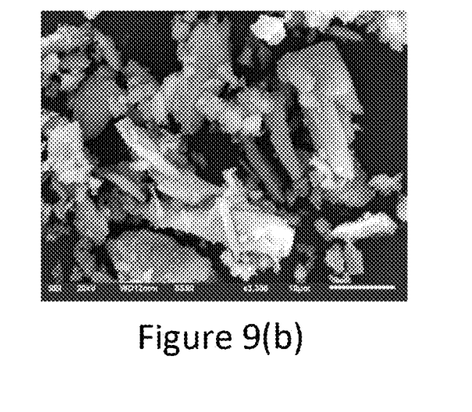
Figure 9C:
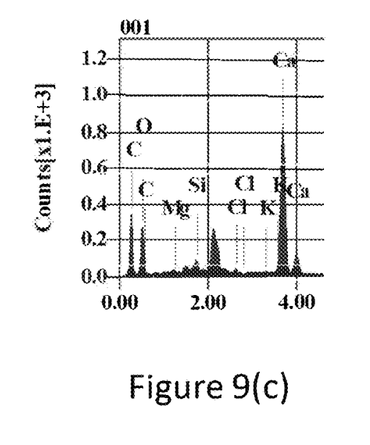
Figure 9D:
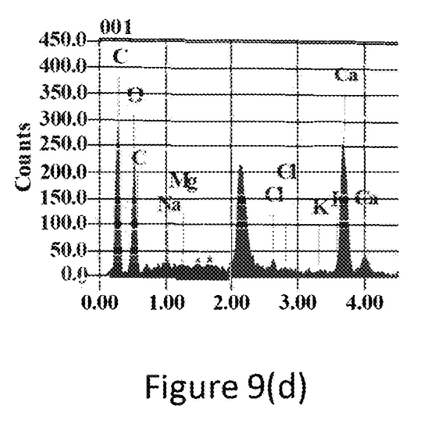

The collected solid's structure and external morphology were evaluated by scanning electron microscopy (SEM) for the fine and dried solid samples from P2 and P3. FIGS. 9(a) and 9(b) show the SEM-captured images. FIGS. 9(c) and 9(d) show the EDS analysis over three captured spots for each tested sample. The morphology of the obtained particles was dominant by the carbonated and bicarbonate solids as indicated by the elongated blocks, plate, and thin spikes or needle-like morphology. The EDS analysis of solids collected from P3 confirmed the high carbonation percentage compared with P2. And the sodium present in sample P3 confirms the desalination reduction in the treated brine.

Figure 10:
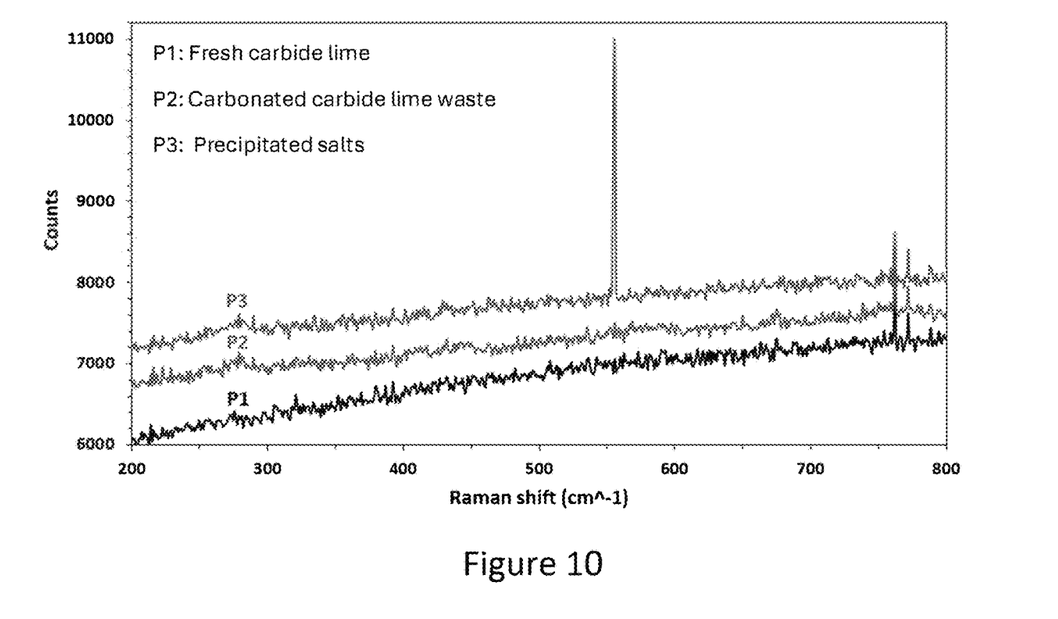
FIG. 10 shows Raman Analysis for the collected fresh and treated carbide lime solids samples, as described herein.

Raman spectroscopy measurements were implemented to confirm the structure of the collected solids P1, P2, and P3. The noticeable difference and deviation of the recorded intensity for each sample confirm the differences in the compositions and morphological characteristics as can be seen in FIG. 10. In addition, the Raman analysis for the collected solids P3 confirms the presence of $NaHCO_3$ as well as $CaCO_3$ with the obtained peaks at frequencies of 1058, 761, 703, 506, 204, and 151 $cm^{-1}$, which are in good agreement with the Raman analysis of the pure $NaHCO_3$ (1050, 680, 200, 220 and 180 $cm^{-1}$), and the pure calcium carbonate (1088, 712, 279, and 153 $cm^{-1}$).

Production and Characterization of Sulfur-Based Concrete from the Carbonated Brine Salts The Arabian Gulf region has many desalination plants with the capacity to produce ten million cubic meters of fresh water per day, which is about half of the world's daily desalination capacity. The use of selected waste materials in concrete mixes that are generated from Sulfur concrete is a type of concrete where cement and water are not used; instead, melted sulfur which acts as a binding agent, is used to bind the fine and coarse aggregate and the filler material like fly ash together to form a hard concrete.

Typical concrete requires 28 days to reach 90% strength. Sulfur concrete hardens in hours and gains strength faster than regular concrete. Sulfur concrete has 80 MPa compressive strength. Flexural and tensile strengths of 16 and 7 MPa for sulfur concrete have been found. Modifiers affect sulfur's features. Aggregates impact sulfur concrete's characteristics. It is a global sustainable development objective, to use waste resources to create sustainable building materials. Oil and gas produce wastes like sulfur (a major industry in the UAE and the Gulf countries, for example). Carbide lime (calcium hydroxide) is another acetylene waste, extracted salts from desalination of the brine water, and last is the desert's unused sand.

The sulfur concrete combination of embodiments can be generated from UAE industrial waste: elemental sulfur, dune sand, and carbide lime waste. The present disclosure aims to use industrial waste for $CO_2$ capture and storage, while simultaneously desalinating seawater and benefiting from its salts.

To create various sulfur-solidified structures, a batch mixer, a continuous heating system, and steel molds are used to accomplish the solidification procedures in the laboratory. The final product is a sulfur-containing polymer, which on cooling possesses glass-like properties. Sulfur concrete was manufactured, according to ACI 548.2R-93, by preheating sand and the extracted brine salts before the mixing step to a temperature of 120-200° C., then mixing with melted elemental sulfur at 120-140° C. until a homogeneous mixture is obtained. The temperature is maintained throughout the mixing process. In embodiments, the hot mixture is poured into pre-heated cubic and cylindrical molds and settled on a vibrating table for 1 min. After curing at 40° C. for 24 hours, the samples were kept at room temperature. The different processes can be performed continuously or in separate phases.

Figure 11:
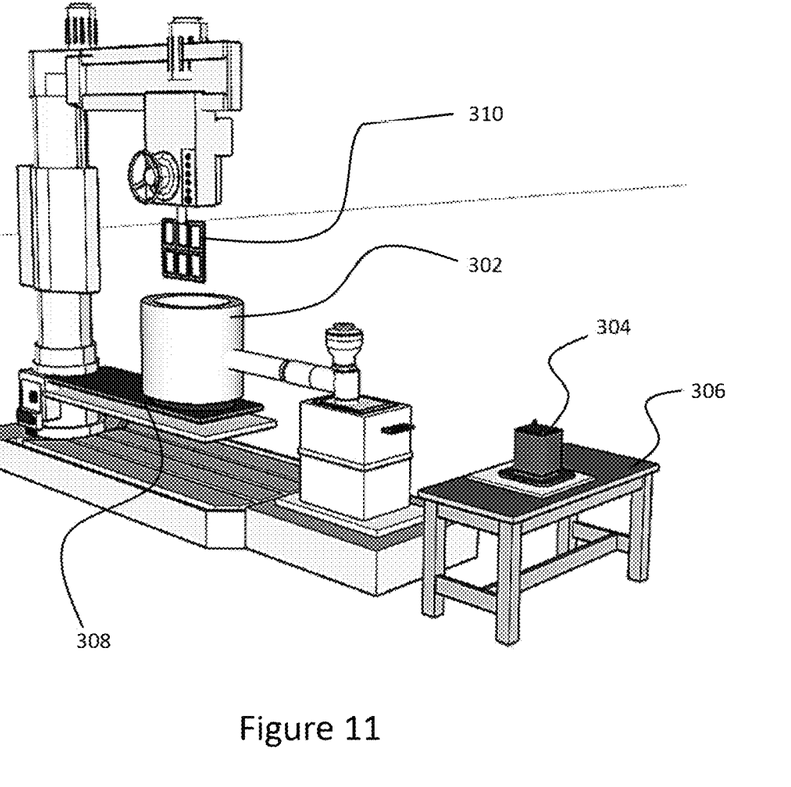
FIG. 11 shows a diagram of equipment for sulfur concrete manufacture, as described herein.

A heating and mixing equipment for sulfur concrete is used to manufacture high-quality sulfur concrete, as shown in FIG. 11.

The heating and mixing equipment comprises a stainless-steel double-walled cylinder 302 to circulate the hot oil for heating the mixture. The mixture is placed within a double-walled mixing cylinder 302 to be raised to temperature and mixed using the rotating/stirring blades 310.

The machine is also equipped with an electric heating stove 308 with a power of 5000 W. The electric heating stove 308 is capable of swinging in and out beneath cylinder 302 to apply additional heat to the cylinder and the mixture therein.

The mixture, once mixed and ready, is poured into a mold 304. The mold is placed on a vibrating table 306, which vibrates to ensure that the mixture is properly set within the mold.

Different sulfur concrete mix proportions were designed as indicated in Table 3. The proportions of the mixture components were selected in terms of the mass fraction.

TABLE 3

Manufactured Sulfur concrete mix proportions.

| Mix name | Sulfur (%) | Sand (%) | Aggregate type | Aggregate (%) |
|---|---|---|---|---|
| SC Type 1 | 33 | 33 | Carbide lime | 34 |
| SC Type 2 | 36 | 33 | Carbonated carbide lime | 31 |
| SC Type 3 | 38 | 33 | Carbonated precipitated salts & carbide lime | 29 |

The desirable balance between sulfur binders composed of elemental sulfur mixed with sand and the extracted solids from desalination of the brine using carbide lime and $CO_2$ is shown. Sufficient workability of the mixture must be ensured to allow homogenous mixing and operation of equipment. Mechanical properties of the manufactured sulfur concrete were tested using the strength testing machine (Wykeham Farrance), with a maximum load of 200 KN. The compressive strength of cylindrical sulfur concrete specimens was performed according to ASTM C39 (1986). The splitting strength test of TCS-SC was performed according to ASTM C496-90. Specimens were cured in an oven with a gradual cooling rate of 5 degrees/min, de-molded after 24 hours, and stored in incubators at tested temperatures.

Table 4 shows the optimum mechanical properties of the prepared SC using the mixer machine, which shows a significant superiority in the mechanical properties.

TABLE 4

Comparison of the main properties and characteristics of Portland Cement Concrete (PCC) and Sulfur Concrete (SC)

| Property | Unit | SC | PCC |
| --- | --- | --- | --- |
| Density | g/cm3 | 2.234-2.453 | 2.45 |
| The minimal period for forming an element | Hour | 2-10 | 24 |
| The minimal period of nominal strength | Day | 1 | 28 |
| Compressive strength | MPa | 35-60 | 40 |
| Splitting tensile Strength | MPa | 2-4 | 3.3 |
| Flexural Strength | MPa | 7-12 | 5.4 (3.5-5.5) |
| Moisture absorption | % | 0.17-0.3 | 3-6% |
| Pore Volume | CC | 0.893 | 9.494 |
| Porosity | % | 1.569 | 18.8 |

The microstructure of different concretes was inspected on freshly fractured samples. SEM analysis has shown that the formation of calcium carbonate was possible, and most calcium carbonates were calcite. Precipitated calcium carbonate is formed and mixed with other salts found in natural seawater. While the pretreated brine solution contains many types of metal cations, the reactivity of the calcium cation permitted large amounts of calcium carbonate salts to be produced.

Sulfur concrete manufacturing is a step toward international sustainable development and growth goals. The sulfur concrete embodiments incorporate a variety of industrial waste products, including sulfur, collected particles from the desalination process, and industrial waste byproducts. This will lessen the environmental effect in a variety of ways. First, reusing industrial byproduct garbage relieves strain on landfills. Furthermore, since no cement is utilized, the usage of sulfur reduces the carbon footprint of the concrete sector. Water will also be conserved since no water is used to make the paste required for the concrete. In addition to the previously mentioned advantages, a long-lasting sulfur concrete mixture with exceptional properties will be developed, and applications in hostile environments and important structures will be investigated.

The present disclosure demonstrates the ability to use brine salts along with other industrial by-products like carbide lime and $CO_2$ in the production of sustainable constructed materials. Concrete according to embodiments of the present disclosure showed high compressive, tensile, and flexural strength when compared to normal concrete. Moreover, the moisture absorption and air content were low which indicated the reduction of the effect of different environmental conditions and therefore high durability.

Moreover, a special filler can be extracted from the brine. The products are building materials with smooth surfaces that are easy to design and set much faster than normal concrete. The sulfur concrete produced from waste materials is corrosion-resistant to harsh environments and impervious to moisture infiltration. Sulfur concrete has many industrial applications such as sidewalks and roadblocks, construction of drainage and sewage facilities, basic coverage foundations, making acid tanks, manufacturing and repairing concrete platforms, etc.

It will be understood that the above embodiment descriptions are given by way of example only and that various modifications may be made by those skilled in the art. Although various embodiments have been described above with a certain degree of particularity, or with reference to one or more individual embodiments, those skilled in the art could make numerous alterations to the disclosed embodiments without departing from the scope of this invention. It is to be understood that any feature described in relation to one example may be used alone, or in combination with other features described, and may also be used in combination with any features of any other of the examples, or any combination of any other examples.

The invention claimed is:

1. A method of producing sulfur concrete using precipitated carbonated brine salts, the method comprising:
    obtaining precipitated brine salts from a brine salt solution, wherein obtaining the precipitated brine salts comprises:
        mixing the brine salt solution with calcium oxide, wherein the calcium oxide is comprised in carbide lime waste, to form a basic suspension having at least the calcium oxide and the brine salt solution as constituents;
        treating the basic suspension using carbon dioxide so that at least a portion of the carbon dioxide reacts with the constituents to cause carbonated brine salts to precipitate from the salt solution; and
        separating the precipitated carbonated brine salts out from the treated basic suspension to produce a treated brine salt solution; and
    forming the sulfur concrete, wherein forming the sulfur concrete comprises:
        mixing elemental sulfur with a modifying agent to form a sulfur-containing polymer;
        pre-heating aggregates to a pre-determined temperature, wherein the aggregates comprise at least the precipitated carbonated brine salts and solid carbide lime waste; and
        mixing the aggregates with the sulfur-containing polymer to form the sulfur concrete,
    wherein:
        the precipitated carbonated brine salts and/or solid carbide lime waste are present in a total amount of 29 wt. % to 34 wt. % of the sulfur concrete, and
        the sulfur-containing polymer is present in an amount of 33 wt. % to 38 wt. % of the sulfur concrete.

2. The method of claim 1, wherein precipitated brine salts comprise one or more of: calcium carbonate, and/or sodium bicarbonate/carbonate.

3. The method of claim 1, wherein treating the basic suspension comprises bubbling a carbon dioxide containing feed gas through the basic suspension.

4. The method of claim 3, wherein the carbon dioxide is present in the feed gas by at least 10% by mass.

5. The method of claim 3, wherein treating the basic solution comprises drawing off a stream of treated feed gas.

6. The method of claim 1, comprising directing the treated basic suspension to a mixing tank to retain the treated basic suspension as a slurry, after the step of treating the basic suspension with carbon dioxide.

7. The method of claim 1, wherein separating the precipitated brine salts from the treated basic suspension comprises one or more of: filtration, sedimentation, and/or chemical recovery.

8. The method of claim 1, wherein the modifying agent comprises oligomeric hydrocarbons.

9. The method of claim 1, wherein the modifying agent comprises bitumen.

10. The method of claim 1, wherein the aggregates comprise sand.

11. The method of claim 1, wherein the aggregates are pre-heated to 120° C. to 200° C.

12. The method of claim 1, wherein the aggregates are mixed with the sulfur-containing polymer at 120° C. to 140° C.

13. The method of claim 12, wherein the mixed aggregates and sulfur-containing polymer are cured at 40° C. for 24 hours.

14. The method of claim 12, wherein additional sand and/or fillers are added to the mixed aggregates and sulfur-containing polymer.

* * * * *